United States Patent [19]

Takano

[11] Patent Number: 5,278,808
[45] Date of Patent: Jan. 11, 1994

[54] OPERATING UNIT ATTACHING AND REMOVING APPARATUS FOR A VEHICLE-MOUNTED ACOUSTIC DEVICE

[75] Inventor: Yoshihiro Takano, Toda, Japan
[73] Assignee: Clarion Co., Ltd., Japan
[21] Appl. No.: 958,509
[22] Filed: Oct. 8, 1992
[30] Foreign Application Priority Data Oct. 11, 1991 [JP] Japan .................................. 3-264029

[51] Int. Cl.⁵ .............................................. H04B 1/20
[52] U.S. Cl. .......................................... 369/11; 369/12; 369/75.2
[58] Field of Search ................. 369/11, 10, 7, 12, 75.1, 369/75.2, 6, 76, 292; 360/137, 33.1; 403/90

[56] References Cited

U.S. PATENT DOCUMENTS 4,811,314  3/1989  Alves ...................................... 369/10
5,054,011 10/1991  Alves ...................................... 369/12

Primary Examiner—Robert J. Pascal
Assistant Examiner—Ali Neyzari
Attorney, Agent, or Firm—Price, Gess & Ubell

[57] ABSTRACT

An operating unit (12) with an insertion opening (11) through which a CD (29) is insertable. A device body (10) with a conveying roller 19 which conveys the CD (29); a lock and release mechanism (22) which locks/-releases the operating unit (12) to/from the device body (10); a CD detector (20) which detects the CD (29) present in the insertion opening (11) before the lock and release mechanism (22) releases the operating unit (12); and a microcomputer (21) which causes the conveying roller 19 to load the CD (29) when the CD detector (20) detects the CD (29) present in the insertion opening (11).

6 Claims, 7 Drawing Sheets

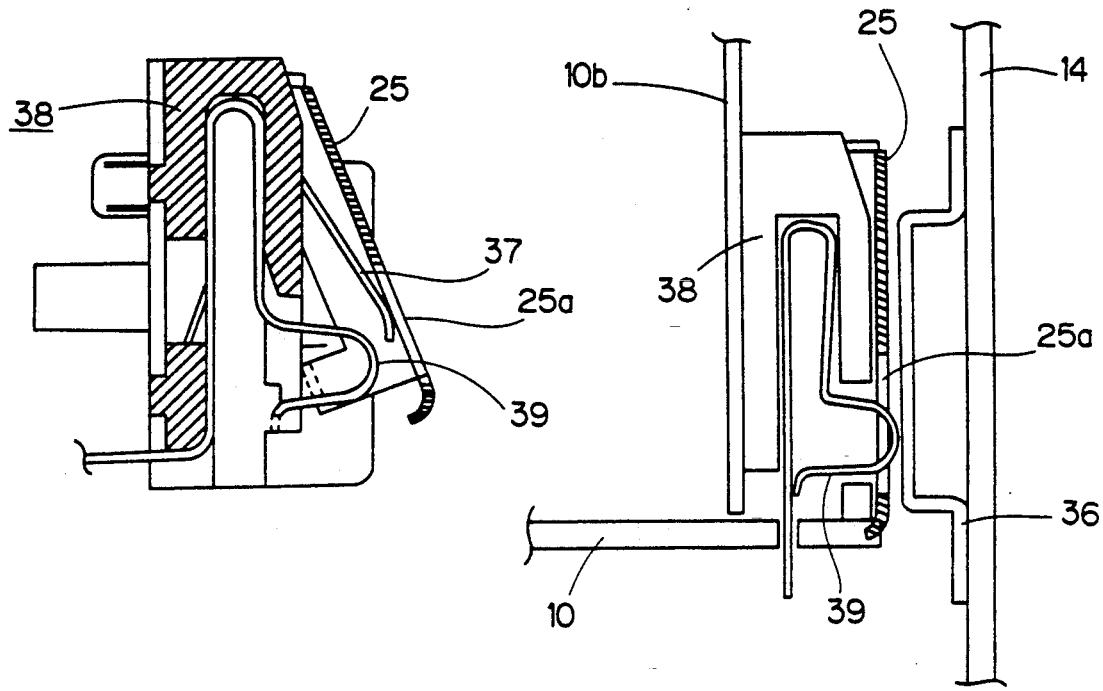

OPERATING UNIT ATTACHING AND REMOVING APPARATUS FOR A VEHICLE-MOUNTED ACOUSTIC DEVICE

BACKGROUND OF THE INVENTION

The present invention relates to apparatus for attaching and removing an operating unit for a vehicle-mounted acoustic device to and from a mounting body of the acoustic device fixed to the vehicle, the operating unit being an element of the acoustic device and having an insertion opening through which a recording medium is passed.

DESCRIPTION OF RELATED ART

Recently, as vehicle-mounted acoustic devices have become highly sophisticated, theft of such acoustic devices has often occurred, which is a very serious problem. Various measures are presently taken to prevent such theft. One known effective measure is an operating unit attaching and removing apparatus for such an acoustic device. The operating unit is such that when the user leaves a vehicle, he removes the operating unit from a body of the acoustic device to disable the operation of the acoustic device. The use of such an operating unit is effective for prevention of theft. A conventional example of such an operating unit attaching and removing apparatus for a vehicle-mounted acoustic device will be described below with respect to FIGS. 12 and 13. FIG. 12 shows the operating unit mounted on the device body, while FIG. 13 shows the operating unit removed from the device body.

A cassette tape recorder as a vehicle-mounted acoustic device is composed of a device body 1 and an operating unit 4. The device body 1 is fixed to the vehicle and has a front panel 1a which faces the user. The operating unit 4 is removably attached to the front panel 1a which has a volume control and other elements thereon and also an insertion opening 2 through which a cassette pack (not shown) in which a cassette tape is accommodated is insertable. When the cassette pack is inserted into the opening, it is loaded by conveying means (not shown) provided inside the opening 2 and carried into the device body 1 to thereby reproduce recorded sounds on the cassette tape put in the cassette pack.

By the reversal operation of the conveying means to eject the cassette pack, the cassette pack is carried from inside the device body to the opening so that it is removed from the opening 2. A lock and release button 3 slidable widthwise of the front panel 1a is provided on the front panel 1a close to and below the opening 2 to fix and release the operating unit 4 to and from the front panel 1a.

The operating unit 4 takes substantially the form of a rectangle having substantially the same dimensions as the opening 2 and having an upper surface, a lower surface, a front and a rear. The front of the operating unit 4 has a plurality of buttons 4a which operate the device body 1. The operating unit 4 has, at the center of the upper surface thereof, an engagement slit 4b which is engageable with the lock and release button 3. When the operating unit 4 is attached to the front panel 1a, the operating unit 4 is fitted on both sides into the front panel 1a, the lock and release button 3 is slid in the direction of attachment to fit into the engagement slit 4b to thereby fix the operating unit 4 to the front panel 1a. At this time, the operating buttons 4a are arranged such that a designed pattern on the front panel 1a continues.

A contact unit 5 is provided, which electrically contacts the operating unit 4, on the front panel 1a which the rear of the operating unit 4 contacts. The contact unit 5 biases the operating unit 4 outward at all times.

When the lock and release button 3 is slid in the direction of release, the button 3 is disengaged from the engagement slit 4b. The operating unit 4 is pushed outward by the contact unit 5 to be removed from the front panel 1. In this way, the operating unit 4 is easily attached to and removed from the device body 1. Thus, when the user leaves the vehicle, he removes the operating unit 4 from the device body 1 to disable the cassette tape player for prevention of theft.

As the area of the front of the operating unit 4 is larger, it can be found that the vehicle-mounted acoustic device is more difficult to handle. Therefore, an apparatus for attaching and removing an operating unit containing its overall front panel to and from the device body has recently been proposed. According to this apparatus, it become clear that the operation of the device body is rendered impossible by removing the overall front panel from the device body to thereby further improve the effect of prevention of theft.

If the operating unit contains the overall front panel, the following inconvenience illustrated in FIG. 14 occurs. The fact that the operating unit 41 contains the overall front panel means that an opening 42 is formed in the operating unit 41. Generally, if a recording medium 43 is ejected from the device body 1 to the operating unit 41, it is held in the opening 42. If the operating unit 41 is removed under such a situation, there is a danger that the recording medium 43 would fall out of the opening 42 or the opening 42 or the recording medium 43 would be broken. Especially if the recording medium is a CD (Compact Disk), it is likely to be broken easily because it is made of a thin plastic material, which is a serious problem.

The present invention is proposed in view of such problem. It is an object of the present invention to provide an operating unit attaching and removing apparatus for a vehicle-mounted acoustic device which ensures prevention of theft of such device and safety of the operating unit and a recording medium when they are removed.

SUMMARY OF THE INVENTION

In order to achieve the above object, the present invention provides an operating unit attaching and removing apparatus for a vehicle-mounted acoustic device, comprising:

a body of the device fixed to a vehicle for reproducing data on a recording medium;

an operating unit attached removably to the device body for operating the device body and having an insertion opening through which the recording medium is insertable;

conveying means for performing a loading operation including conveyance of the recording medium from the insertion opening to a predetermined position within the device body and an ejecting operation including conveyance of the recording medium from the predetermined position within the device body to the insertion opening;

locking and unlocking means for locking and unlocking the operating unit to and from a front of the device body;

first detecting means for detecting the unlocking of the operating unit by the locking and unlocking means;

second detecting means for detecting the recording medium present in the insertion opening; and control means for causing the conveying means to perform the loading operation when the second detecting means detects the recording medium and the first detecting means detects the unlocking of the operating unit by the locking and unlocking means.

The operating unit attaching and removing apparatus according to the present invention may further comprise third detecting means for detecting the completion of the loading operation of the recording medium, and wherein when the third detecting means detects the completion of the loading operation based on the operations of the first and second detecting means, the control means enables the locking and unlocking means to release the operating unit.

The operating unit attaching and removing apparatus according to the present invention may further comprise fourth detecting means for detecting the unlocking of the operating unit from the device body.

When the operating unit is removed from the device body, the second detecting means first checks whether there is a recording medium positioned in the opening. When it detects the recording medium and the first detecting means detects the release of the operating unit by the locking and unlocking means, the control means operates to cause the conveying means to load the recording medium. Thereafter, the locking and unlocking meansd unlocks the operating unit on the basis of the unlocking operation of the locking and unlocking means by the first detecting means to thereby permit removal of the operating unit from the device body.

If the second detecting means detects no recording medium positioned in the opening, the control means does not cause the conveying means to load the recording medium. Thus when the first detecting means has detected the unlocking operation of the operating unit by the locking and unlocking means, the locking and unlocking means unlocks and removes the operating unit from the device body. If the first detecting means detects no unlocking operation of the operating unit by the locking and unlocking means, the locking and unlocking means performs no unlocking operation.

As described above, in the present invention, no removal of the operating unit is performed when the recording medium is placed in the opening and the conveying means loads the recording medium automatically in the device body. When the operating unit is removed, possible fall of the recording medium and possible breakage of the opening and the recording medium are prevented.

In a second aspect of the present invention, when the second detecting means has detected the recording medium and the first detecting means has detected the unlocking operation by the locking and unlocking means, and further the third detecting means has detected the completion of the loading of the recording medium on the basis of the detection of the first and second detecting means, the control means permits the unlocking operation of the locking and unlocking means. Thus the operating unit is not removed from the device body during the loading operation of the recording medium by the conveying means. As a result, breakage of the opening and recording medium is securely prevented.

In a third aspect of the present invention, the detector which has detected the removal of the operating unit from the device body may be used as resetting means for the control means to thereby prevent the control means from running wild.

BRIEF DESCRIPTION OF THE DRAWINGS

FIG. 6 is a perspective view of a locking and unlocking unit in the present embodiment.

FIG. 7 is a partially cross-sectional side view of the device body of the present embodiment.

FIG. 8 is a side cross-sectional view of a connection of the device body and operating unit of the present embodiment.

DESCRIPTION OF THE PREFERRED EMBODIMENT

Figure 1:
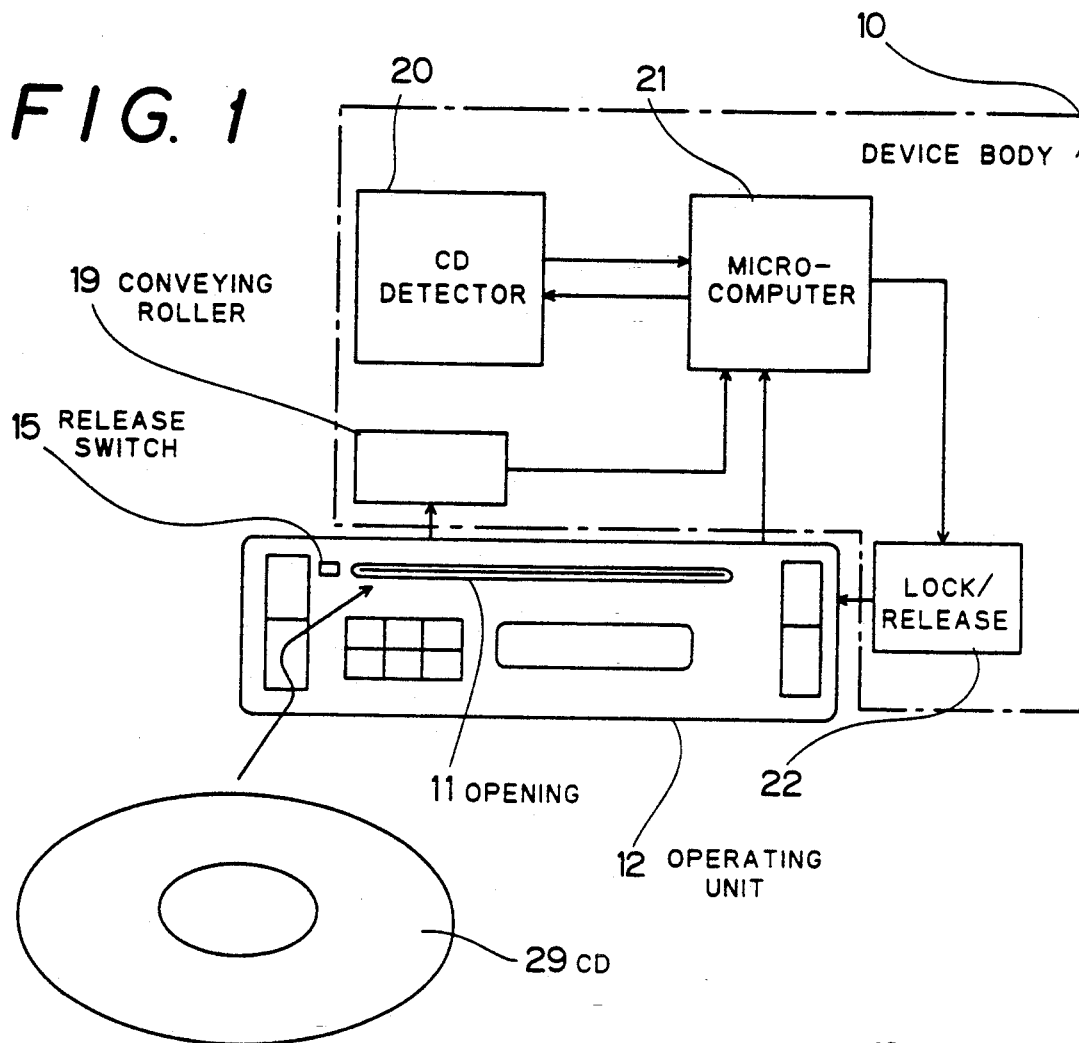
FIG. 1 is a block diagram of the structure of one embodiment according to the present invention.

One embodiment of an operating unit attaching and removing apparatus for a vehicle-mounted acoustic device according to the present invention will be described with respect to FIGS. 1-11. The same reference numeral as is used to denote the element of the conventional acoustic device is used to denote the corresponding element of the embodiment according to the present invention, and further description thereof will be omitted.

As shown in a block diagram in FIG. 1, the present embodiment is an operating unit attaching and removing apparatus provided in a vehicle-mounted acoustic device which reproduces data on a CD 29. The acoustic device is composed of a body 10 and a operating unit 12 attached removably to the front of the body 10. The structural features of the embodiment are that the operating unit 12 has an insertion opening 11 and a release switch 15 while the body 10 has a conveyer roller 19, a CD detector 20, a microcomputer 21, a lock and release mechanism 22 and a detector 26 which detects the removal of the operating unit 12.

A. INTERNAL STRUCTURE OF THE DEVICE BODY:

The structural elements of the device body 10 will first be described with respect to FIG. 1. The CD detector 20 cooperates with CD sensors 28, to be described in more detail later, to form detecting means and delivers to the microcomputer 21 data on the position of a CD 29 present in the opening 11. The detection means detects data on the position of the CD 29 and corresponds to the second and third detection means defined in the attached claims.

The microcomputer 21 provides control means which controls the respective operations of the device body 10 and receives various data from operation buttons, release switch 15, CD detector 20 and operating unit removal detector 26 on the operating unit 12. The microcomputer 21 determines the operation of the conveyer roller 19 and attachment/removal of the operating unit 12 and gives an appropriate command to the conveyer roller 19, the lock and release mechanism 22, etc., to control these elements.

Figure 2:
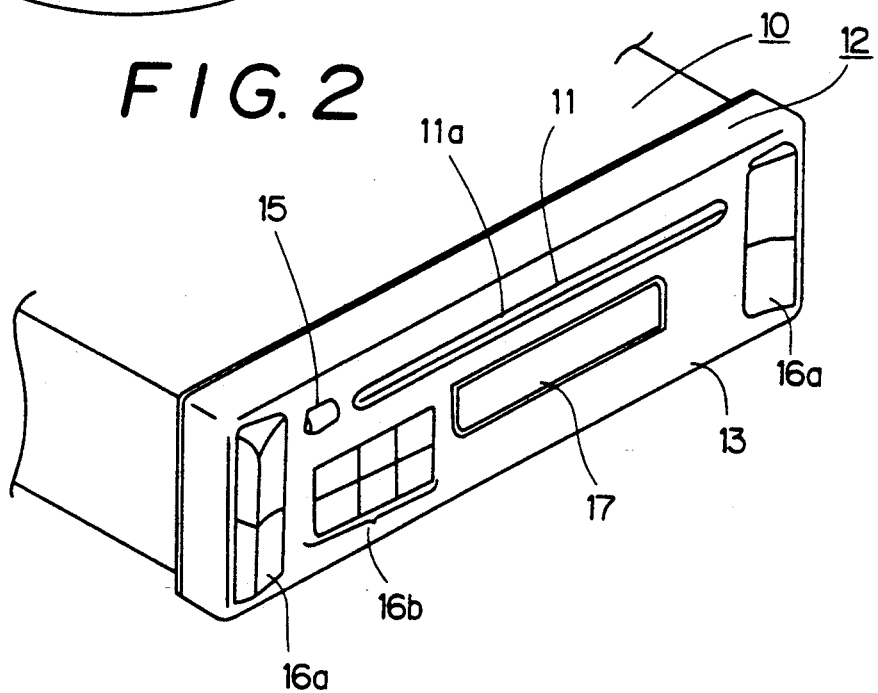
FIG. 2 is a perspective view of the embodiment with the operating unit being attached to the device body.
Figure 3:
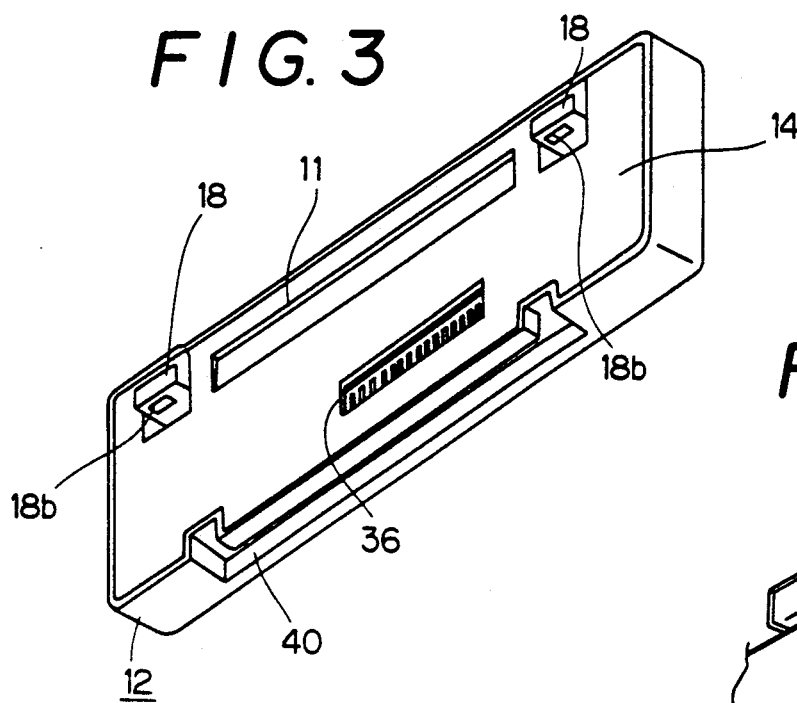
FIG. 3 is a perspective view of the rear of the operating unit of the present embodiment.
Figure 4:
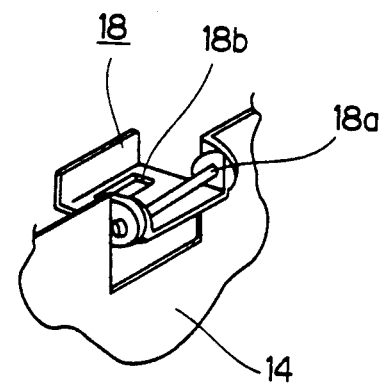
FIG. 4 is a perspective view of part of the rear of the operating unit of the present embodiment.

B. STRUCTURE OF THE OPERATING UNIT 12:

FIG. 2 is a perspective view of the present embodiment (where the operating unit 12 is attached to the device body 10). FIG. 3 is a perspective view of the rear of the operating unit 12. FIG. 4 is a perspective view of part of the rear of the operating unit 12.

The structure of the operating unit 12 will be next described. The operating unit 12 has substantially the form of a rectangle and a front panel 13 facing the user and a rear panel 14 contacting the device body 10. The front and rear panels 13 and 14 have in the vicinity of an upper edge an insertion opening 11 through which a CD 29 is insertable. A dust cover 11a is attached to the opening 11 provided on the front panel 13. A release switch 15 is provided adjacent to the left end of the opening 11 to operate a lock and release mechanism 22. The switch 15 is a first means which detects the unlocking operation of the lock and release mechanism 22 and which reports this operation to the microcomputer 21.

As will be clear from FIG. 2, a pair of large substantially triangular prism buttons 16a is provided along each of the sides of the front panel 13. A group of six small square operation buttons 16b is arranged widthwise in two rows on the left-hand portion of the front panel 13 in order to operate the device body 10. A rectangular display panel 17 is provided adjacent to the right-hand side of the group of buttons 16b at substantially the center of the front panel 13 to indicate the operating state of the device.

As shown in FIG. 3, a flap 18 engageable with a lock and release mechanism 22 is provided in the vicinity of each of the sides of the rear panel 14. A U-like groove 40 is provided extending along the lower-edge central portion of the rear panel 14.

As shown in FIG. 4, the flap 18 takes the form of an L and has at its base a support shaft 18a fixed to the rear panel 14 such that the flap 18 is rotatable relative to the rear panel 14. The flap 18 has an engagement slot 18b near its folding edge.

Figure 5:
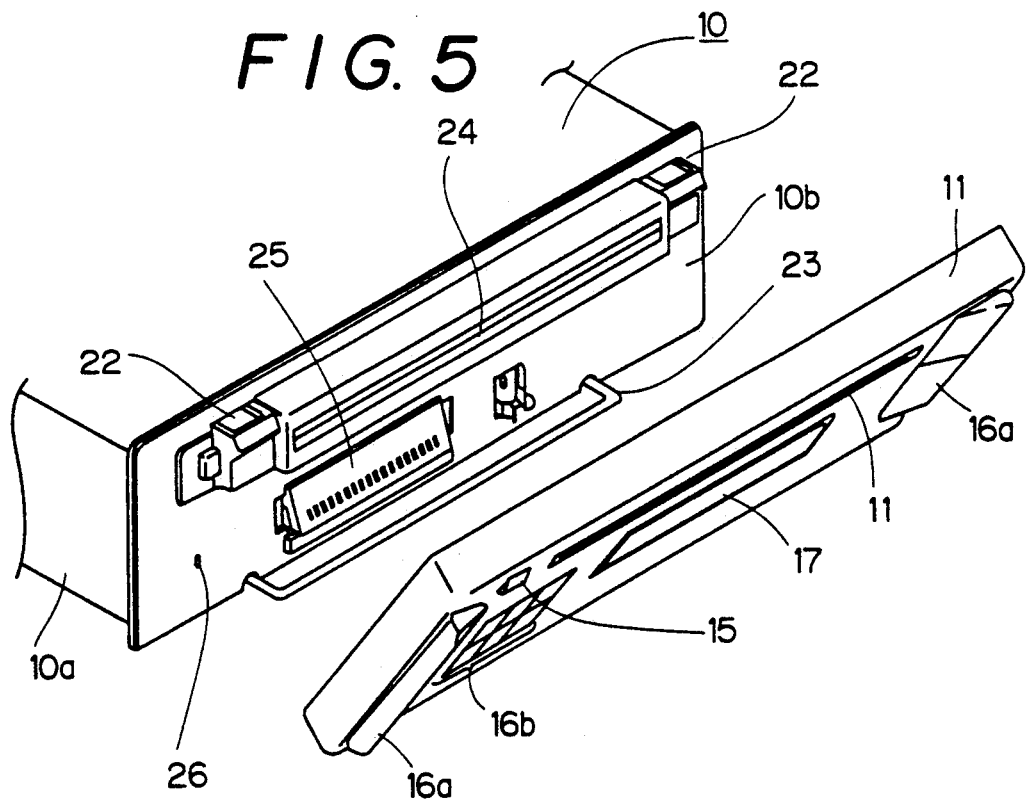
FIG. 5 is a perspective view of the present embodiment from which the operating unit is removed.

C. STRUCTURE OF THE DEVICE BODY:

FIG. 5 is a perspective view of the present embodiment where the operating unit 12 is removed from the device body 10.

The structure of the front of the device body 10 will now be described. The device body 10 is incorporated into a casing 10a, which in turn is accommodated in a bracket (not shown). The bracket is attached to a vehicle so that the device body is fixed to the vehicle. Attached to the front of the casing 10a is a front plate 10b whose lower edge has a support shaft 23 which takes the form of a U-like member protruding forward (toward the user) to engage the groove 40, to thereby support the operating unit 12 from below.

The front plate 10b has, in the vicinity of its upper edge, an opening 24 through which a CD 29 is insertable. The opening 24 is disposed flush with the opening 11 in the operating unit 12 when the operating unit 12 is attached to the device body 10. A shielding plate 25 is provided at substantially the center of the front plate 10b and takes the form of a rectangle rotatable around its upper edge.

The detector 26 which detects the removal of the operating unit 26 is provided in the left-hand end portion of the front plate 10b. The detector 26 detects whether the operating unit 12 is attached to, or removed from, the device body 10 during its normal operation and sends to the microcomputer 21 data on the attachment/removal of the operating unit 12 to/from the device body 10.

Since there is no means for operating the device body 10 when the operating unit 12 is removed from the device body 10, the device body 10 performs no operations irrespective of data delivered from the detector 26 to the microcomputer 21. Therefore, the detector 26 may be suspected to be unnecessary, but it actually plays the following role. Unless the detector 26 is provided, the microcomputer 21 may run wild, which causes an undesirable situation in the operation of the system. In other words, the detector 26 constitutes a reset means for the microcomputer 21.

Provided at each of right and left ends of the front plate 10b is an lock and release mechanism 22 which will be described in more detail later in the "E. STRUCTURE AND OPERATION OF LOCKING AND UNLOCKING MECHANISM 22".

D. STRUCTURE AND OPERATION OF A CONNECTION OF OPERATING UNIT 12 AND DEVICE BODY 10:

FIG. 6 is a partial side cross-sectional view of the operating unit 12. FIG. 7 is a side cross-sectional view of a connection of the operating unit 12 and device body 10.

The connection between the operating unit 12 and device body 10 has the following structure. An elongated rectangular connector receiver 36 is provided at substantially the center of the rear panel 14 of the operating unit 12 and receives signals from the operation buttons 16a, 16b.

A spring 37 and a rotation limiting unit (not shown) are provided in the vicinity of the rotational shaft of the shielding plate 25 in the device body 10. Thus, the shielding plate 25 is biased and turned by the resiliency of the spring 37 toward the operating unit 12. The turning of the shielding plate 25 is restricted by a turning restriction unit 38. Unless a force is applied to the shielding plate 25, the shielding plate is maintained tilted.

A plurality of through holes 25a is arranged widthwise in a lower edge portion of the shielding plate 25. A like number of terminals 39, which are passable through the corresponding through holes 25a, are provided after those holes 25a. The terminals 39 are integrally formed as a unit to thereby constitute a connector 38.

When the operating unit 12 is attached to the device body 10, it abuts on and is turned around the support shaft 23 toward the device body 10. Thus the shielding plate 25 is pressed by the rear panel 14 to be folded on the device body 10. At this time, the terminals 39 protrude through body 10. At this time, the terminals 39 protrude on the connector receiver 36 to thereby connect the connector 38 of the device body 10 and the connector receiver 36 of the operating unit 12 electrically.

When the operating unit 12 is attached to the device body 10, the shielding plate 25 is pressed against the operating unit 12 by the resiliency of the spring 37, so that the operating unit 12 is subjected to a force which tends to release the operating unit 12 away from the device body 10. However, when the lock and release mechanism 22 is engaged in the engagement slot 18b in the flap 18 attached to the operating unit 12 and the lock and release mechanism 22 is in a fixed state, as will be described in more detail later, the operating unit 12 is fixed to the device body 10.

E. STRUCTURE AND OPERATION OF THE LOCK AND RELEASE MECHANISM 22:

FIG. 8 is a perspective view of the lock and release mechanism 22.

Figure 14:
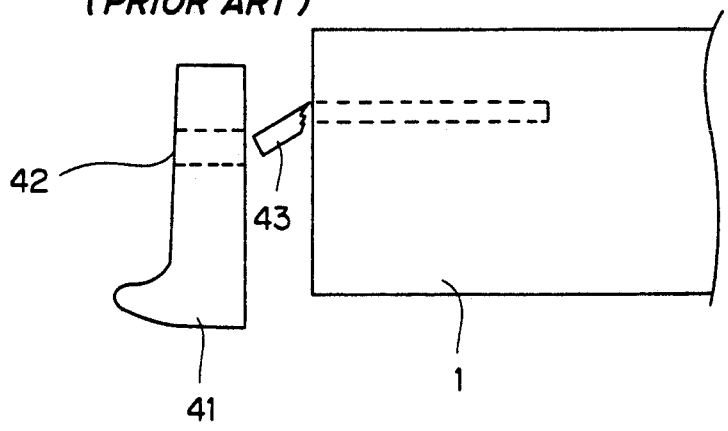
FIG. 14 is a side view of the operating unit attaching and removing apparatus for the conventional vehicle-mounted acoustic device illustrative of a problem with its operating unit.

The lock and release mechanism 22 will be described next. It locks and releases or unlocks the operating unit 12 and cooperates with the flap 18 of the operating unit 12 to compose locking and unlocking means (see FIGS. 3 and 14). The lock and release mechanism 22 is composed of a plunger 31, a slide plate 32, a lock plate 33 and a hook 34 which are attached to a holder 35. The plunger 31 is fixed to the holder 35 and provided with an iron core 31a movable back and forth (this way, as viewed in FIG. 8).

The slide plate 32 is attached for back and forth movement to the holder 35 and is provided therein with an engagement slot 32b in which the iron core 31a is engaged. Provided on top of the slide plate 32 is an L-like engaging lug 32a on which the lock plate 33 abuts.

The lock plate 33 is attached to the holder 35 such that the lock plate 33 is turned around its base portion. The lock plate 33 abuts at its end on the engagement rug 32a of the slide plate 32 so that its turning operation is restricted. The lock plate 33 is provided at its end with a rectangular opening 33b in which the rug 32a is insertable. The lock plate 33 is provided at its central portion with a roof-like portion 33a.

The hook 34 is attached to the holder 35 such that it moves back and forth as viewed in FIG. 8 and is provided with a roof-like concavity 34a engaged with the roof-portion 33a of the lock plate 33. The hook 34 is provided at its end with an upward protruding pawl 34b which is engaged with the engagement slot 18b in the flap 18.

When the operating unit 12 is attached to the device body 10, the lock and release mechanism 22 performs the following locking operation. The plunger 31 does not operate and the slide plate 32 restricts the turning operation of the lock plate 33. Therefore, the movement of the hook 34 is also restricted. Thus, the operating unit 12 engaged with the hook 34 through the flap 18 is fixed to the device body 10.

The lock and release mechanism 22, thus fixed, is released by the operation of the release switch 15. First, by the operation of the release switch 15, the plunger 31 is operated, so that the iron core 31a is moved backward (leftward in FIG. 8). Simultaneously, the slide plate 32 is moved backward. Therefore, the rug 32a is inserted into the slot 33b in the lock plate 33 so that the restriction on the turning operation of the lock plate 33 is released, and hence the lock plate 33 is rotatable.

When the operating unit 12 is attached to the device body 10, it receives a releasing force exerted by the shielding plate 25 which receives the resiliency of the spring 37. Thus, the hook 34 engaged with the operating unit 34 receives a force which moves the hook 34 forward (rightward in FIG. 8). Therefore, the notch-like concavity 34a in the hook 34 applies a downward force to the roof-like portion 33a of the lock plate 33. Thus when the lock plate 33 is rotatable due to the backward movement of the slide plate 32, the lock plate 33 is turned clockwise in FIG. 8. Thus the roof-like portion 33a of the lock plate 33 is released from the notch-like concavity 34a in the hook 34 to thereby release the restrictions on the forward and backward movements of the hook 34.

As a result, the force having a direction of release from the shielding plate 25 is transmitted through the operating unit 12 to the hook 34, so that the hook 34 moves forward (rightward in FIG. 8). This causes the operating unit 12 to turn around the support shaft 23 as if it fell forward. Finally, the operating unit 12 is lifted to disengage the pawl 34c of the hook 34 out of the engaging slot 18b in the flap 18 to thereby remove the operating unit 12 out of the device body 10.

Figure 9:
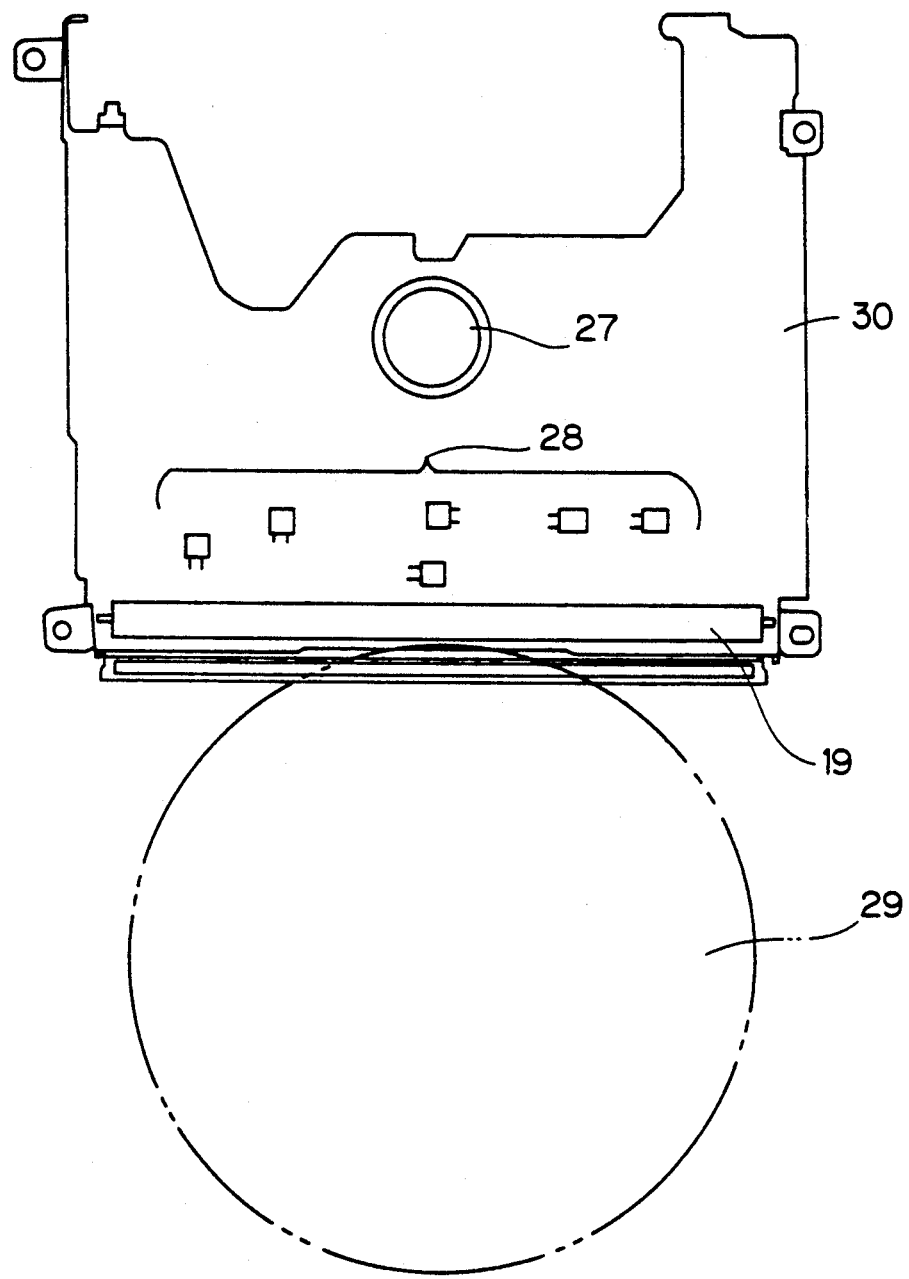
FIG. 9 is a plan view of the conveying means of the present embodiment where a CD is inserted.
Figure 10:
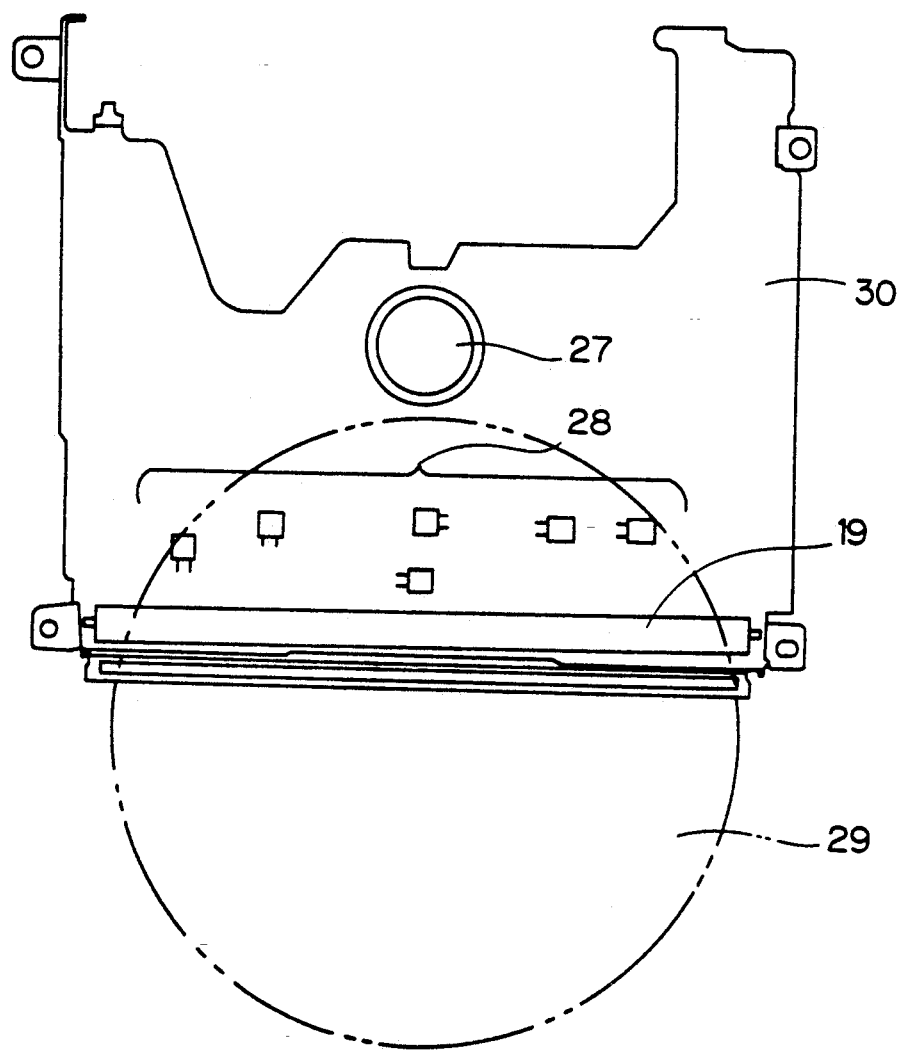
FIG. 10 is a plan view of the conveying means of the present embodiment where no CD is inserted.

F. STRUCTURE AND OPERATION OF THE CONVEYING ROLLER 19:

FIGS. 9 and 10 are plan views of the device body 10 provided with a conveying roller 19.

As shown in FIGS. 9 and 10, a plate-like chassis 30 is provided in the device body 10. The conveying roller 19, which is means a for conveying a CD 29, is provided at a lower edge of the chassis 30. It performs a loading operation by which the CD 29 is conveyed from the opening 11 to a turntable 27 under a command from the microcomputer 21, and an ejecting operation by which the CD 29 is conveyed from the turntable 27 to the opening 11.

The turntable 27 is disposed at substantially the center of the chassis 30. When the turntable 27 with the CD 29 placed thereon receives a reproduction command from the microcomputer 21, it rotates at high speed to reproduce data on the CD 29. CD sensors 28 of an optical sensor are disposed in the spacing between the conveying roller 19 and the turntable 27. Each optical sensor is composed of a set of a light emitting element and a photodetector. When an optical path for the corresponding sensor is blocked by the CD 29 which passes above the sensor, the sensor produces a detection signal. The CD detector 20 obtains data on the position of the CD 29 on the basis of a combination of those detection signals from the corresponding CD sensors 28 and delivers the data to the microcomputer 21.

Figure 11:
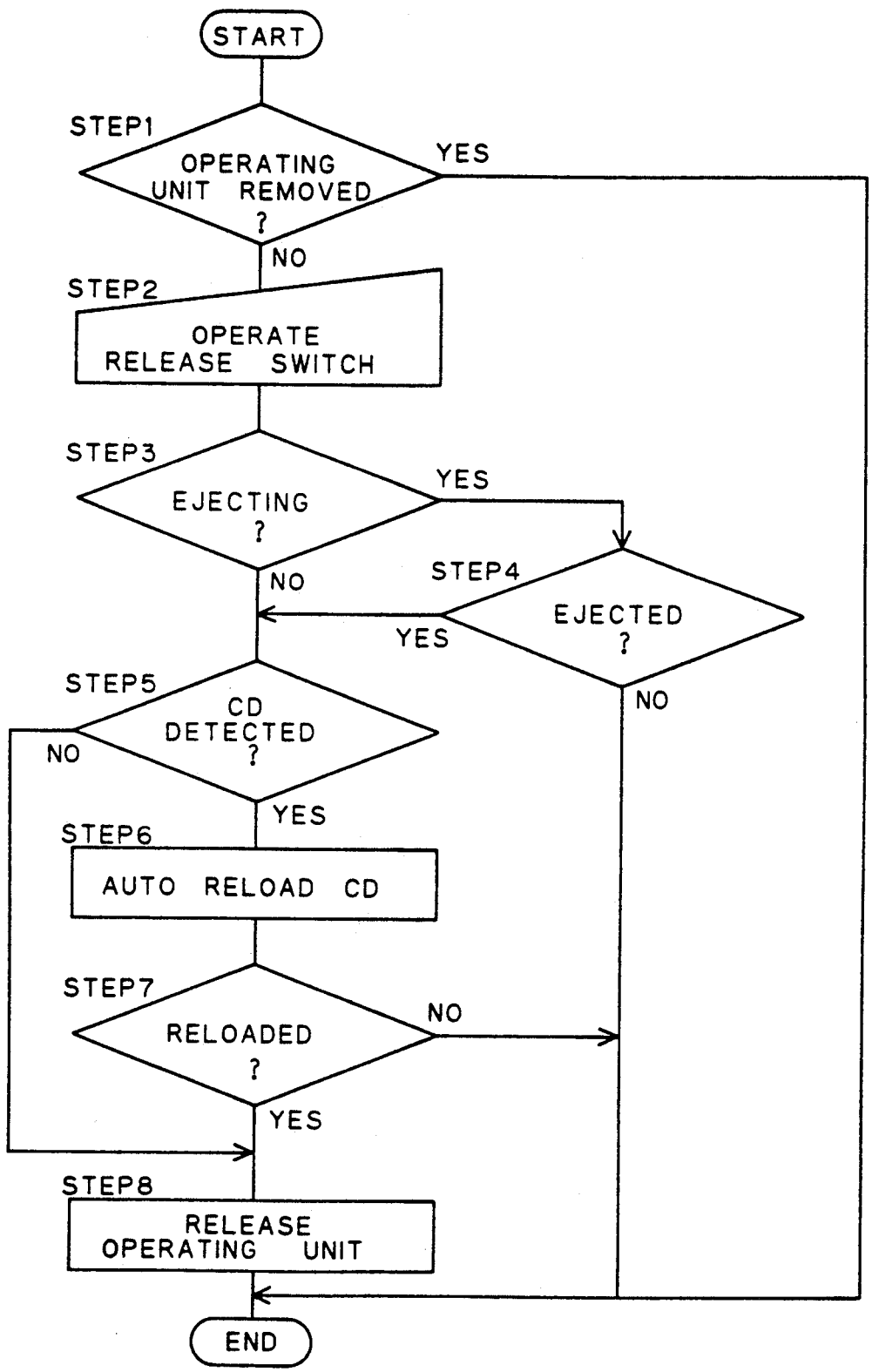
FIG. 11 is a flowchart indicative of the operation of the embodiment.
Figure 12:
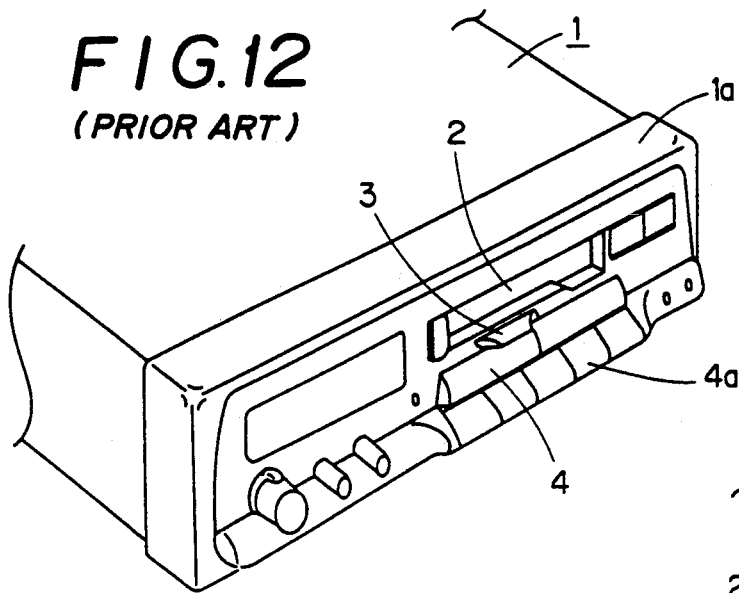
FIG. 12 is a perspective view of an operating unit attaching and removing apparatus for a conventional vehicle-mounted acoustic device where the operating unit is attached.
Figure 13:
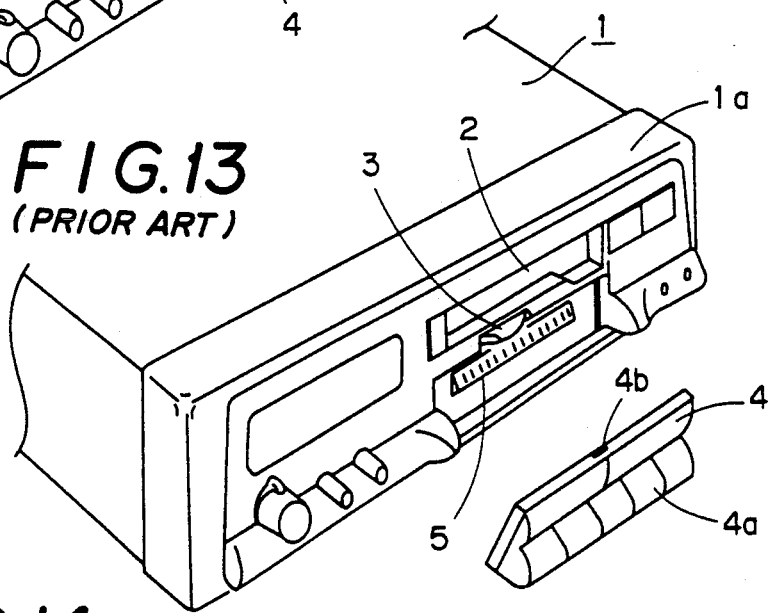
FIG. 13 is a perspective view of the operating unit attaching and removing apparatus for a conventional vehicle-mounted acoustic device where the operating unit is removed.

G. OPERATION OF THE PRESENT EMBODIMENT:

FIG. 11 is a flownchart indicative of the operation of the present embodiment.

When the operating unit 12 attached to the device body 10 is removed in the present embodiment, the detecting unit 26 detects attachment/removal of the operating unit 12 to/from the device body 10 (step 1). When the detector 26 sends data on the removal to the microcomputer 21, the microcomputer 21 determines that the operating unit 12 has already been removed from the device body 10 to thereby terminate the operation of the present embodiment. When the operating unit 12 has been removed from the device body 10, the device body 10 is in a disabled state.

When the release switch 15 is operated on in a state where the detector 26 has sent data on the attachment to the microcomputer 21 (step 2), the microcomputer 21 checks whether the conveying roller 19 is ejecting the CD (step 3). If so, the microcomputer 21 determines whether the ejecting operation of the conveying roller 19 has been completed (step 4). If the ejecting operation of the conveying roller 19 has not been completed at step 4, the operation of the present embodiment is terminated.

After the microcomputer 21 has confirmed that the conveying roller 19 has not performed the ejecting operation, or has completed such operation, the CD detector 20 detects the CD 29 positioned in the insertion opening 11 on the basis of a combination of detection signals from the CD sensors 28 (step 5). When the CD detector 20 sends the microcomputer 21 data on the absence of the CD 29 in the opening 11, the microcomputer 21 gives a release command to the lock and release mechanism 22 (step 8). In response, the lock and release mechanism 22 performs a releasing operation to thereby enable the operating unit 12 to be removed.

When the CD detector 20 sends the microcomputer 21 data on the presence of the CD 29 in the insertion opening 11, the microcomputer 21 gives the conveying roller 19 a load command. Thus the conveying roller 19 performs an auto reload operation (step 6). When the microcomputer 21 confirms the completion of the auto reload operation of the conveying roller 19 at step 7, control passes to step 8 where the microcomputer 21 gives a release command to the lock and release mechanism 22 to cause the same to release the operating unit 12 from the device body 10. When the microcomputer 21 does not confirm the completion of the auto reload operation of the conveying roller 19 at step 7, the operation of the present embodiment is terminated.

According to the present embodiment, described above, the conveying roller 19 performs an auto reload operation in the state where the CD 29 is positioned in the insertion opening 11 before the lock and release mechanism 22 performs the releasing operation, so that the CD 29 is loaded in the device body 10. In addition, when the microcomputer 21 confirms the completion of the auto reload operation of the conveying roller 19, it performs the removal of the operating unit 12 and hence ensures the prevention of fall of the CD 29 and of damage to the insertion opening 11 and the CD 29. Since the detector 26 is the reset means for the microcomputer 21, it prevents the microcomputer 21 from running wild to thereby improve the reliability of the device.

The present invention is not limited to the above embodiment. The respective shapes and dimensions of the elements are changeable when required. For example, the detector 26 which detects the removal of the operating unit 12 may be provided on the operating unit 12. The method of detecting the removal of the operating unit 12 may be optical or mechanical. While in the embodiment the CD detector 20 and the CD sensors 28 serve the functions of both the first detecting means, which detects a recording medium present in the insertion opening, and the third detecting means, which detects the completion of the loading of the recording medium, it should be noted that an embodiment where the first and third detecting means are provided separately falls within the scope of the present invention.

As described above, according to the present invention, only when the second detecting means detects a recording medium present in the insertion opening and the first detecting means detects the unlocking operation of the locking and unlocking means, the control means causes the conveying means to perform a loading operation, so that fall of the recording medium, etc., is prevented when the operating unit 12 is removed, even if the insertion opening for the recording medium is provided in the operating unit 12, and safety of the removed operating unit and recording medium and, hence, reliability of protection of the vehicle-mounted acoustic device against theft, are improved.

What is claimed is:

1. An operating unit attaching and removing apparatus for a vehicle-mounted acoustic device, comprising:
    a body of the device fixed to a vehicle for reproducing data on a recording medium;
    an operating unit attached removably to the device body for operating the device body and having an insertion opening through which the recording medium is insertable;
    conveying means for performing a loading operation including conveyance of the recording medium from the insertion opening to a predetermined position within the device body and an ejecting operation including conveyance of the recording medium from the predetermined position within the device body to the insertion opening;
    locking and unlocking means for locking and unlocking the operating unit to and from a front of the device body;
    first detecting means for detecting the unlocking of the operating unit by the locking and unlocking means;
    second detecting means for detecting the recording medium present in the insertion opening; and
    control means for causing the conveying means to perform the loading operation when the second detecting means detects the recording medium and the first detecting means detects the unlocking of the operating unit by the locking and unlocking means.

2. Apparatus according to claim 1, further comprising third detecting means for detecting the completion of the loading operation of the recording medium, and wherein when the third detecting means detects the completion of the loading operation based on the operations of the first and second detecting means, the control means enables the locking and unlocking means to release the operating unit.

3. Apparatus according to claim 2, further comprising fourth detecting means for detecting the unlocking of the operating unit from the device body.

4. A vehicle-mounted acoustic device, comprising:
    a first member affixed to a vehicle for reproducing sound from a removable recording medium;
    a second control member, removably attached to the first member, for operating the first member, and having an insertion opening through which a recording member is insertable into the first member;
    conveying means for performing a loading operation, including conveyance of the recording medium from the insertion opening to a predetermined position within the first member, and an ejecting operation including conveyance of the recording medium from the predetermined position within the first member to the insertion opening;

locking means for locking and unlocking the second control member to and from the first member;

first detecting means for detecting the unlocking of the second control member by the locking means;

second detecting means for detecting a recording medium present in the insertion opening; and control means for causing the conveying means to perform a loading operation when the second detecting means detects the recording medium and the first detecting means detects the unlocking of the second control member by the locking means.

5. An acoustic device according to claim 4, further comprising third detecting means for detecting the completion of the loading operation of the recording medium, and wherein, when the third detecting means detects the completion of a loading operation based on the operation of the first and second detecting means, the control means enables the locking means to release the second control member.

6. An acoustic device according to claim 5, further comprising fourth detecting means for detecting the unlocking of the second control member from the first member.

* * * * *